United States Patent
Florance et al.

(10) Patent No.: US 10,169,797 B2
(45) Date of Patent: Jan. 1, 2019

(54) IDENTIFICATION OF ENTITIES BASED ON DEVIATIONS IN VALUE

(71) Applicant: CoStar Realty Information, Inc., Washington, DC (US)

(72) Inventors: Andrew Florance, Washington, DC (US); Jack Spivey, Atlanta, GA (US); Abhi Jeevaganambi, Cumming, GA (US); Stuart Richens, Atlanta, GA (US)

(73) Assignee: CoStar Realty Information, Inc., Washington, DC (US)

( * ) Notice: Subject to any disclaimer, the term of this patent is extended or adjusted under 35 U.S.C. 154(b) by 442 days.

(21) Appl. No.: 14/970,106

(22) Filed: Dec. 15, 2015

(65) Prior Publication Data
US 2017/0169493 A1    Jun. 15, 2017

(51) Int. Cl.
*G06Q 30/00* (2012.01)
*G06Q 30/06* (2012.01)

(52) U.S. Cl.
CPC .............. *G06Q 30/0625* (2013.01)

(58) Field of Classification Search
CPC ........................... G06Q 30/06–30/08
USPC ................................. 705/26.1–27.2
See application file for complete search history.

(56) References Cited

U.S. PATENT DOCUMENTS

| | | |
|---|---|---|
| 6,636,803 B1 | 10/2003 | Hartz, Jr. et al. |
| 2006/0206388 A1 | 9/2006 | Burritt |
| 2013/0159142 A1* | 6/2013 | Moreno ............. G06Q 30/0601 705/26.63 |
| 2014/0100989 A1 | 4/2014 | Zhang et al. |
| 2014/0229336 A1 | 8/2014 | Wormhoudt et al. |
| 2015/0242747 A1* | 8/2015 | Packes ................. G06N 3/0454 706/17 |

* cited by examiner

*Primary Examiner* — Ethan C Civan
(74) *Attorney, Agent, or Firm* — Fish & Richardson P.C.

(57) ABSTRACT

Methods, systems, and apparatus, including computer programs encoded on a computer readable storage medium, for identifying entities based on value. In one aspect, the method may include actions for receiving a query that specifies a location. Additional actions may include identifying candidate entities that are identified as responsive to the query and that are associated with the location, selecting a subset of the candidate entities, and determining a representative value of an attribute that is associated with each candidate entity of the subset of the candidate entities. Other actions may include in response to determining that the current value of the attribute that is associated with the particular candidate entity of the subset deviates more than a threshold amount from the representative value, adjusting a ranking score for the particular candidate entity, and ranking the particular candidate based at least on the ranking score for the particular candidate entity.

15 Claims, 5 Drawing Sheets

IDENTIFICATION OF ENTITIES BASED ON DEVIATIONS IN VALUE

FIELD

This specification is generally related to search engines.

BACKGROUND

There are variety of different ways to identify the most relevant search results. For instance, some search engines may identify search results associated with web pages that include the highest number of keyword occurrences. Alternatively, or in addition, some search engines may return search results based on the degree of similarity between one or more query parameters and features of a web page. Alternatively, or in addition, some search engines may provide search results based on the amount of money a content owner paid the operator of the search engine.

Each of these approaches may be used to identify search results in response to a user query. Such techniques may be particularly effective at finding a set of search results that are responsive to a user's query based on one or more query parameters. However, sometimes the most relevant search results to a user are not the search results that have the highest correlation to search terms.

SUMMARY

According to one implementation of the subject matter described by this specification, a system is provided to search and retrieve entities based on the best available deals. For instance, a system that includes a location based search engine and ranking engine are provided that may receive a query, identify a set of search results responsive to the query, and then analyze the search results to determine whether a value associated with an entity that corresponds to each respective search result satisfies one or more predetermined value benefit thresholds. In some aspects, the system provided by the present disclosure may not provide the set of search results that is most responsive to a received query based on one or more query parameters alone. Instead, the system may identify and provide search results that correspond to one or multiple entities that provide the best available deals.

In some aspects, the subject matter embodied in this specification may be embodied in methods that may include the action of receiving a query that specifies a location. Additional actions may include identifying candidate entities that are identified as responsive to the query and that are associated with the location, determining, for a particular candidate entity, (i) a current value of an attribute that is currently associated with the particular candidate entity and, (ii) a historical value of the attribute that was associated with the particular candidate entity at a past time, determining that the current value of the attribute that is currently associated with the particular candidate entity deviates more than a threshold amount from the historical value of the attribute that is associated with the particular candidate entity, and in response to determining that the current value of the attribute that is currently associated with the particular candidate entity deviates more than a threshold amount from the historical value of the attribute that is associated with the particular candidate entity, adjusting a ranking score for the particular candidate entity. Additional actions may include ranking the particular candidate entity among the identified candidate entities based at least on the ranking score for the particular candidate entity.

These and other versions may each optionally include one or more of the following features. For instance the method also includes actions that comprise receiving a request from a user to refine search results based on value.

In some implementations, the candidate entities may include one or more apartments. In some aspects, the threshold amount from the historical value may be set to a value that is a predetermined amount less than the historical value of the attribute. In other aspects, the threshold amount from the historical value may be set to a value that is a predetermined amount more than the historical value of the attribute. In at least one implementation, the value may be price-per-square-foot.

In other aspects, the subject matter embodied in this specification may be embodied in methods that include the action of receiving a query that specifies a location. Other actions may include identifying candidate entities that are identified as responsive to the query and that are associated with the location, selecting a subset of the candidate entities, determining a representative value of an attribute that is associated with each candidate entity of the subset of the candidate entities, determining, for a particular candidate entity of the subset, a current value of the attribute that is associated with the particular candidate entity, determining that the current value of the attribute that is associated with the particular candidate entity of the subset deviates more than a threshold amount from the representative value of the attribute that is associated with the candidate entities of the subset, and in response to determining that the current value of the attribute that is associated with the particular candidate entity of the subset deviates more than a threshold amount from the representative value of the attribute that is associated with the candidate entities of the subset, adjusting a ranking score for the particular candidate entity. Additional actions may include ranking the particular candidate entity among the identified candidate entities of the subset based at least on the ranking score for the particular candidate entity.

These and other versions may each optionally include one or more of the following features. For instance, the representative value may be the average value of the attribute for the subset of the candidate entities. In addition, actions of selecting a subset of candidate entities may further include identifying a first candidate entity, identifying a geographic location associated with the first candidate entity, and selecting a subset of candidate entities that are similar to the first candidate entity and reside within the same geographic location as the first candidate entity. In some implementations, the identified candidate entities may include one or more apartments.

In at least one aspect, the threshold amount from the representative value is set to a value that is a predetermined amount less than the representative value of the attribute.

Other versions include corresponding systems, apparatus, and computer programs configured to perform the actions of the methods, encoded on computer storage devices.

DETAILED DESCRIPTION

Figure 1:
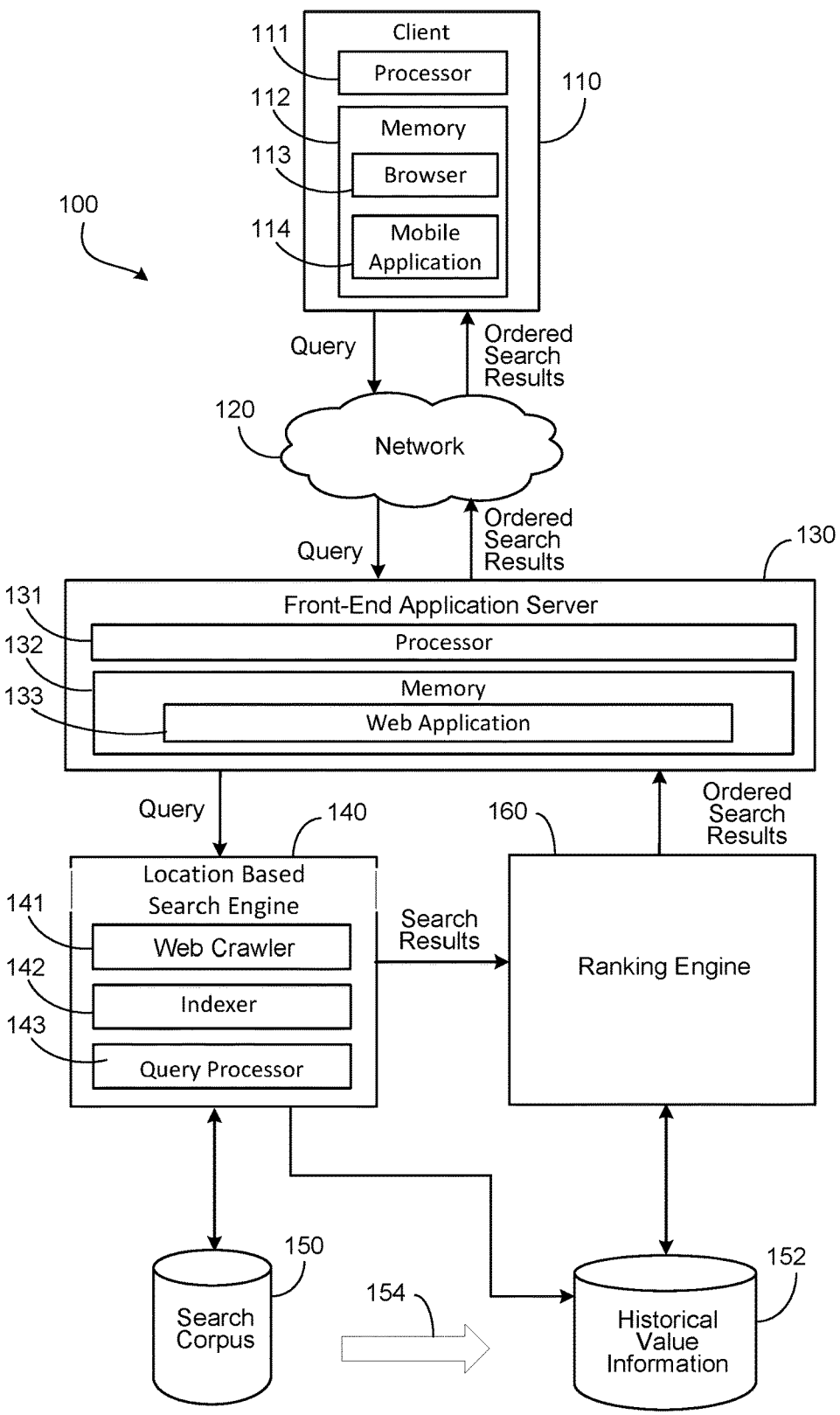
FIG. 1 is an example of a system that may facilitate identification of entities based on the best available deals.

FIG. 1 is an example of a system 100 that may facilitate identification of entities based on the best available deals. A deal may include, for example, an entity price that is lower than a historical price for the same or substantially similar entity, or an entity price that is lower than the current price of other substantially similar entities, and therefore saves a user money. One or more particular types of best available deals are further described below. The system 100 may include a client device 110, a network 120, a front-end application server 130, a location based search engine 140, a search corpus database 150, a historical value information database 152, and a ranking engine 160.

Client device 110 may be representative of one, or multiple, client devices. The client device 110 may include a mobile computing platform or a non-mobile computing platform. Mobile computing platforms may include, for example, a smartphone, tablet, laptop computer, or other thin client devices. Non-mobile computing platforms may include, for example, desktop computers, set top box entertainment systems, video game consoles, or the like. Client device 110 may be configured to communicate with front-end application server 130 via network 120 using one or more communication protocols.

The client device 110 of system 100 may include at least a processor 111 and a memory 112. The memory 112 may provide for the storage of computer program code associated with one or more applications installed on client 110. The applications may include, for example, a browser 113 or mobile application 114. Processor 111 may be configured to execute the stored computer program code in a manner that allows client 110 to realize the functionality provided by the applications. Processor 111 may also be configured to execute instructions to realize the functionality associated with any of the actions attributed to client 110 below.

The client 110 may be able to access one or more web based applications 133 hosted by front-end application server 130 via network 120 using browser 113. Such web based applications may include, for example, an application that facilitates identification of one or more particular entities that may be available for sale, for lease, or that provide a particular service. An entity may include any item that may be available for sale or for lease such as, for example, a book, a clothing item, a motor vehicle, a consumer electronic item, a house, an apartment, or the like. Alternatively, an entity may include a party that provides a service such as, for example, a restaurant, a barber shop, a day care facility, a school, a doctor's office, a law office, a government agency, or the like. Web application 133 may utilize one or more back-end components in order to identify one or more particular entities based on the best available deals. In certain instances, web application 133 may utilize the methods set forth herein to identify a set of one or more entities that may provide a best available deals based on the extent to which one or more particular entities are associated with a particular value that deviates more than a threshold amount from a predetermined representative value. Representative values may include, for example, a historical value that was previously associated with a particular entity, an average value associated with a group of substantially similar entities, or the like.

Identification of entities based on the best available deal may be achieved by using client device 110 to search one or more databases such as, for example, search corpus database 150 and then using one or more back-end components to identify and return ordered search results to client device 110 based on data maintained, for example, in historical value information database 152. A user may initiate a search with client device 110 by interacting with one or more search fields provided by web application 133 via a browser 113. For instance, a user may provide an input into a search field that can be used as at least a portion of a search query. Then, the user may instruct the client device 110 to transmit the search query to front-end application server 130 via network 120. Alternatively, or in addition, a user may input a search query by drawing one or shapes around a location of interest on a map provided by a graphical user interface. Client device 110 may then generate a query to identify entities that may reside within geographic locations associated with the one or more shapes drawn by the user on the map provided by a graphical user interface, and transmit the query to front-end application server 130. The front-end application server 130 may then forward the query to one or more back-end data processing systems that may execute the search query. The backend system may identify a set of search results response to the search query, rank each search result in the set of search results, and then return the set of search results that are responsive to the received query to the front-end application server 130. The front-end application server 130 may then forward the search results back to client device 110.

The search results may be displayed on a graphical user interface associated with client device 110 in a variety of different ways that may assist a user in understanding and interpreting the search results. For instance, the search results may be displayed as a list of one or multiple entities, wherein each entity in the list is ordered according to a rank determined by one or more backend components of system 100 such as, for example, ranking engine 160. Alternatively, the search results may be displayed by plotting one or multiple graphical icons on a map of a geographical area that each correspond to a particular entity identified as a search result that is responsive to a received search query. The location of each graphical icon on the map may be indicative of the location of the corresponding entity. In certain instances, search results may be displayed as both a ranked list of entities in a first portion of the graphical user interface and as a plot of graphical icons on a map in a second portion of the graphical user interface. Other ways of displaying search results also fall within the scope of this specification.

Separate from browser 113, a client device 110 may also be able to use a mobile application 114 in order for a user of client device 110 to avail himself of the same, or similar, functionality that was described above as being provided by a web application 133 via browser 113. Mobile application 114 may include an executable software program that was previously downloaded from a mobile application provider. Mobile application 114 may be configured to relay commands input by a user such as, for example, search queries to the front-end application server 130. After receiving a search query from mobile application 114, the front-end application server 130 may request that one or more backend components execute the search query, rank the search results, and then return the ranked search results to mobile application 114, which may display the search results as a ranked list of entities, as plotted graphical icons on a map, or a combination thereof.

Network 120 may be configured to facilitate connectivity between a client device 110 and application server 130. Client 110 and application server 130 may be connected to network 120 via one or more wired, or wireless, communication links. Network 120 may include any combination of one or more types of public and/or private networks including but not limited to a local area network (LAN), wide area network (WAN), the Internet, a cellular data network, or any combination thereof.

Front-end application server 130 may include at least a processor 131 and a memory 132. The memory 132 may provide for the storage of computer program code associated with one or more applications hosted by front-end application server 130. The applications may include, for example, a web application 133 that may facilitate identification of one or more particular entities that may be available for sale, for lease, or that provide a particular service based on the best available deal. Processor 131 may be configured to execute the stored computer program code in a manner that allows front-end application server 130 to realize the functionality provided by the applications. Processor 131 may also be configured to execute instructions to realize the functionality associated with any of the actions attributed to front-end application server 130 below.

Front-end application server 130 may serve as an interface between the client 110 and the back-end components of system 100 that may include, for example, a location based search engine 140, search corpus database 150, historical value information database 152, and ranking engine 160. Front-end application server 130 may be comprised of one or more server computers. Front-end application server 130 may be configured to receive commands from a client device 110, and translate those commands, if necessary, into a format that is compatible with one or more back-end network components. Front-end application server 130 may also employ network security applications such as, for example, a firewall, user authentication, subscription verification, or the like in an effort to supervise access to one or more back-end network components, if necessary.

Front-end application server 130 may also facilitate session management for each browsing session initiated by each respective client device 110 that is currently using a browser 113, or mobile application 114, to avail itself of the services provided by the web application 133. For instance, front-end application server 130 may employ functionality to associate an identifier with each query received by the front-end application server 130 from a particular client 110. The front-end application server 130 may later utilize the identifier in order to associate ordered search results received from a ranking engine 160 with a query received from a particular client 110. The identifier may then be used to return the set of ordered search results to the client device 110 that initiated the query. The identifier may include a user identifier, device identifier, transaction identifier, or the like System 100 may also include a location based search engine 140. Location based search engine 140 may be configured to receive and execute search queries that are associated with a location component. The location component of the search query may be based on a particular location that was input by a user via client device 110. The location component may be the location of the particular client device 110, or some other location that the user of client device 110 has input as an entity search parameter. Alternatively, the location component of the search query may be obtained by front-end application server 130, a back-end network component, or another network component associated with system 100 based on one or more attributes associated with a client device 110. For instance, one of the aforementioned network components may determine the current location of a client device 110. Alternatively, the current location of a client device 110 may be provided to one or more network components of system 100 by a third party. Alternatively, the location component may be determined based on locations that the client device 110 has recently traveled. The location component may include, for example, a neighborhood, a city, a state, a zip code, GPS coordinates, longitude and latitude coordinates, or the like.

Location based search engine 140 may include a web crawler 141, an indexer 142, and a query processor 143. The location based search engine 140 may be hosted by one or multiple server computers. The server computer(s) hosting the location based search engine 140 may be the same server computer(s) that provide the front-end application server 130. Alternatively, however, the server computer(s) hosting the location based search engine 140 may be a different set of one or more server computer(s) that are configured to communicate with the front-end application server 130 via one or more public or private networks.

Web crawler 141 may be configured to traverse computers connected to a computer network such as, for example, the Internet, to scan and identify data associated with particular entities. For instance, web crawler 141 may scan computers associated with a computer network in order to identify web pages, or other files accessible via the computer network, that may include data associated with one or multiple entities that are currently being offered for sale or lease. Alternatively, or in addition, web crawler 141 may scan computers associated with a computer network in order to identify web pages, or other files accessible via the computer network, that may include data associated with one or multiple entities that are currently offering a particular service. The identified web pages, or a subset of the raw data associated therewith, may be stored in search corpus database 150. In some implementations, web crawler 141 may be autonomous software that is configured to periodically scan computer networks in order to identify new, or previously undiscovered, web pages or other network accessible files associated with entities that are currently being offered for sale, for lease, or that may provide a service. Alternatively, or in addition, the functionality of web crawler 141 may be performed by one or more operators of location based search engine 140. For instance, a group of one or more analysts may obtain raw data associated with an entity, and store the raw data in search corpus database 150. Alternatively, or in addition, it is contemplated that a party that offers an entity for sale, for lease, or that provides a service may also upload raw data associated with the entity to search corpus database 150.

The aggregated set of raw data stored in search corpus database 150 may comprise a wealth of data describing a wide spectrum of different entities. For instance, search corpus database 150 may include for each known entity, for example, the entity's name, the entity's location, a description of the entity, a value associated with the entity, or the like. The value for the entity may include, for example, the price of an entity that is being offered for sale or for lease. Alternatively, however, the value for an entity may include, for example, an entity rating. For instance, for an entity that offers a service such as, for example, Bob's Diner, the entity rating may include a feedback score associated with Bob's Diner based on customer experience. Such entity ratings may also be associated with entities for sale or for lease. Other types of raw data associated with an entity may be obtained via the data crawling process and stored in search corpus database 150.

Raw data may also be identified during the data crawling process that includes more than just present values associated with an entity. For instance, the data crawling process may also identify data that may be indicative of a historical value associated with an entity. Such historical value information may be maintained in historical value information database 152.

Historical value information may be obtained in a variety of different ways. For instance, the crawling process may identify an archive of web pages that may provide a value associated with an entity at some point in the past. Alternatively, operators of system 100, or other users of system 100, may analyze historical records and create a log of historical values that may be uploaded to historical value information database 152. Alternatively, known values that were identified and stored in search corpus database 150 may be periodically migrated 154 from search corpus database 150 to historical value information database 152. Such migration 154 may occur based on a detected change in a value associated with a particular entity. Alternatively, such a migration 154 may occur without a detected change in a value associated with a particular entity. For instance, system 100 may periodically migrate 154 the values for each known entity from search corpus database 150 to historical value information database 152 based on the expiration of a predetermined time interval, for example, daily, weekly, monthly, or the like. In other implementations, value information may be migrated 154 for other reasons, as necessary, to build an exhaustive history of value data in historical value information database 152. Alternatively, or in addition, the party that offers an entity for sale, for lease, or that offers a service may manually upload historical value information to historical value information database 152.

Indexer 142 may be configured to analyze the raw data obtained during the crawling process in order to make the raw data searchable. For instance, indexer 142 parse the raw data and extract one or more types of relevant data. For example, the indexer 142 may analyze the raw data to extract an entity's name, an entity's location, and a value associated with the entity. Indexer 142 may than associate the extracted data with one or more keywords. The associated keywords may be compared to aspects of received search queries in order to determine whether the extracted data associated with the keywords is responsive to the search query. Indexer 142 may generate a separate index for each of search corpus database 150 and historical value information database 152. Each respective index may be stored in the search corpus database 150 and historical value information database 152, respectively. Accordingly, indexer 142 may organize the raw data in this way, or other ways, in order to facilitate, a fast, efficient search.

Query processor 143 may be configured to receive a search query from front-end application server 130 that originated at a client device 110. Query processor 143 may be configured to parse the received query, extract any relevant keyword(s) from the received query, and then execute the query against the index generated by indexer 142. Query processor 143 may alter the form of one or aspects of the received query. For instance, query processor 143 may alter one or more keywords in order to expand or narrow the scope of a received query, as necessary. Such alterations to keywords of a query may include, for example, utilizing a root expander, replacing one or more characters with a wildcard character, insertion of one or more Boolean operators between keywords, dynamically altering location information associated with the query, or the like. Query processor 143 may also translate one or more aspects of the received query in order to make the query compatible with the index that is associated with the search corpus database 150. Query processor 143 may then execute the query against the search corpus database 150. Execution of the search query against the search corpus 150 may yield a set of one or multiple search results. The search results may identify, for example, a group of one or multiple links that are associated with entities that are responsive to the query received from client 110. The search result links may reference a web page that includes information associated with the particular entity that corresponds to reach respective link. The information included in the web page may be drawn from search corpus database 150, historical value information 152, or the like. The set of search results may be substantially unordered, or otherwise arranged in an order that is not based on the best available deals. The search results identified by the query processor 143 in response to the received search query may then be passed to the ranking engine 160. In some implementations, the current value for each entity associated with an identified search result may also be passed to ranking engine 160 by location based search engine 140. The location based search engine 140 may communicate with the ranking engine using one or more public or private networks.

System 100 may also include a ranking engine 160. Ranking engine 160 may be hosted by one or multiple server computers. The server computer(s) hosting the ranking engine 160 may be the same server computer(s) that provide the front-end application server 130. Alternatively, however, the server computer(s) hosting the location based ranking engine 160 may be a different set of one or more server computer(s) that are configured to communicate with the front-end application server 130 via one or more public or private networks.

Ranking engine 160 may be configured to perform a series of post processing operations on the set of identified search results. The post processing operations may determine a ranking score that may be associated with each result in the set of search results based on the analysis of a value associated with each entity. For instance, a ranking score may be determined for a search result that is based on the amount that a current value for an entity deviates from historical values for the entity. Alternatively, or in addition, as described below, the ranking score may be determined based on the amount a current value for an entity deviates from the current value of other similar entities. Ranking engine 160 may utilize historical information associated with an entity that is maintained by historical value information database 152 when determining a score for each search result in a set of search results. Ranking engine 160 may then return the set of ordered results to the front-end application server 130 via one or more public or private networks. Front-end application server 130 may then provide the ordered search results to client device 110 via network 120.

Ranking engine 160 may be configured to isolate and analyze search results based on a predetermined geographic region. A geographic region may include, for example, a neighborhood, a city, a state, a zip code, GPS coordinates, longitude and latitude coordinates, a shape drawn by a user on a graphical user interface map, or the like. Once a set of set search results are isolated by geographic region, the ranking engine 160 may analyze the entities associated with each search results. For instance, the ranking engine 160 may determine whether one or more of the entities identified with each of the search results has a current value that has deviated from a historical value. Ranking engine 160 may make such a determination, at least in part, by analyzing current value information received from location based search engine 140, historical information maintained in historical value information database 152, and/or the like. Alternatively, or in addition, ranking engine 160 may analyze the deviation in a current value associated with a search result that corresponds to a particular entity from a representative value associated with a group of other entities in a particular geographic region that may be the same as the entity, or substantially similar. Ranking engine 160 may assign a score to a search result associated with a particular entity that varies in magnitude based on the degree of deviation from one or more predetermined reference values.

Ranking engine 160 may be configured to assign a ranking score based on a decrease, or increase, in a value associated with a particular entity, as appropriate. For instance, there may be instances where a decrease in a particular value is beneficial, and thus may result in a higher ranking score for a search result associated with an entity whose value has dropped by a predetermined amount. For example, if the entity is an apartment that is being offered for lease, a search result corresponding to an apartment for lease that is associated with a value indicating a drop in price when analyzed in view of a predetermined time window may be awarded a higher ranking score than a search result corresponding to an apartment for lease that is associated with a value indicating that the current price has stayed the same, or increased a predetermined amount, when analyzed in view of the same predetermined time window. Alternatively, however, there may be instances where an increase in a particular value is beneficial, and thus may result in a higher ranking score for a search result corresponding to an entity that is associated with a value that has increased by a predetermined amount. For example, if the entity is a Mexican restaurant, a search result corresponding to the Mexican restaurant that is associated with a current customer feedback rating that has increased over a predetermined time window may be awarded a higher ranking score than a search result corresponding to a different Mexican restaurant that is associated with a customer feedback rating that has stayed the same, or dropped, when analyzed in view of the same predetermined time window. Other methods for assigning a ranking score may be used in accordance with systems and methods provided by the present specification.

In some aspects of the present disclosure, ranking engine 160 may be utilized only when requested by a user of client device 110. If a user decides to not use ranking engine 160, the search results may be provided to the client device in the order determined by location search engine 140. Such order may be, for example, based on most expensive price, lowest price, based on an analysis of keyword frequency in a web page associated with the search result corresponding to the entity, based on payments received to increase a ranking score associated with each entity, or the like. Accordingly, client 110 may be able to toggle ranking engine 160 on and off. A user of client device 110 may choose to toggle the ranking engine 160 on, for example, when the user of client device 110 wants to initiate search of a particular set of entities based on the best available deals.

Figure 2A:
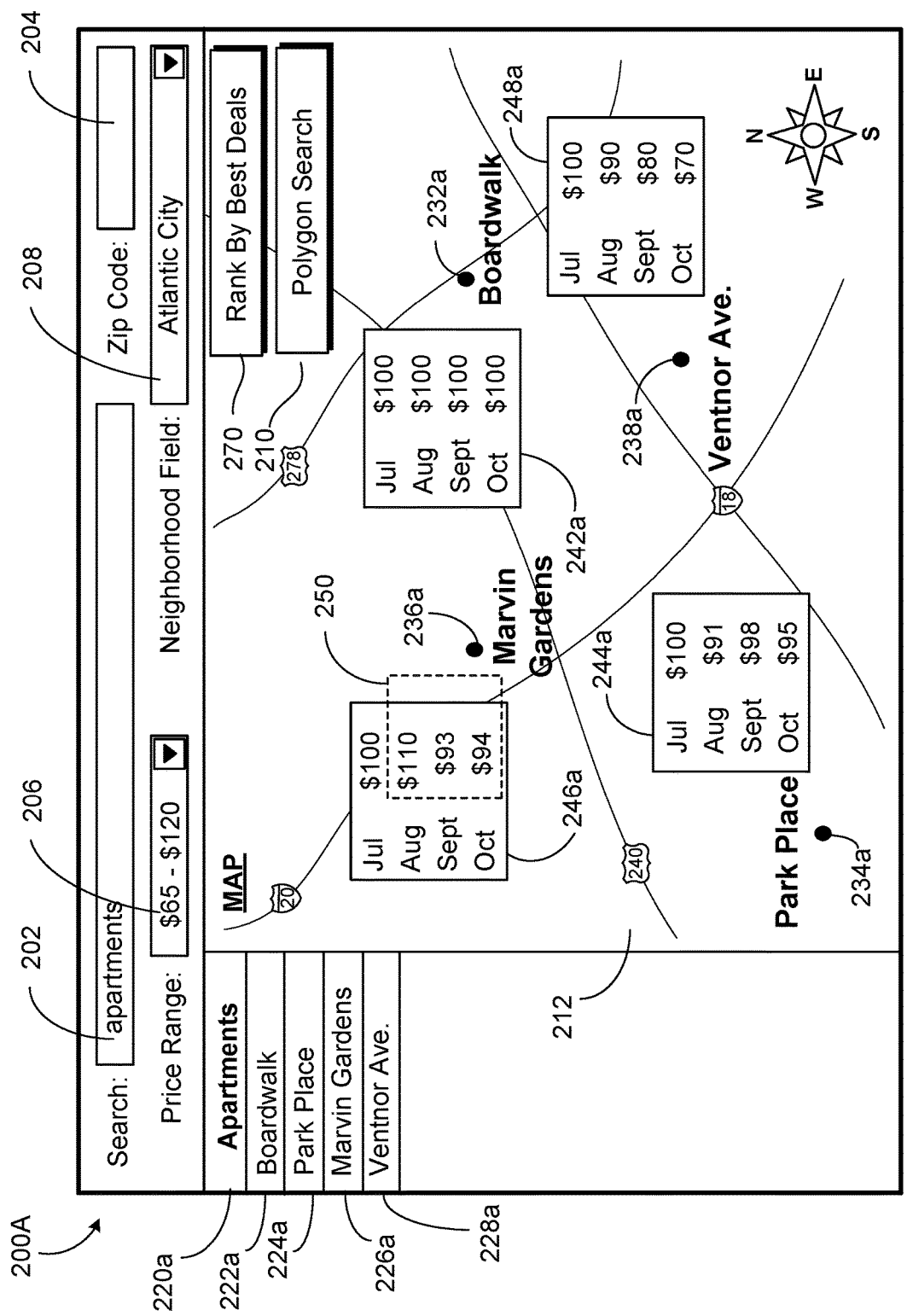
FIG. 2A is an example of graphical user interface for displaying a set of search results that may include multiple entities in response to a search query.

FIG. 2A is an example of a graphical user interface 200A for displaying a set of search results 220a that includes multiple entities in response to a search query. The graphical user interface 200A may include a search field 202, a zip code field 204, a price range field 206, a neighborhood field 208, a polygon search button 210, a map 212, a list of search results 220a, and a rank by best deal button 270. The search field 202 may be configured to receive one or more keywords from a user that may be used to generate a search query. For instance, a user may input the name of a town, city, or state where the user would like to search for a particular entity. Alternatively, a user may submit a keyword representative of particular entity such as, for example, "A Tale of Two Cities," "iPad," "Chipotle," "Tiny Tots Day Care," "2BR apartments," "apartments," or the like. The zip code field 204 may be configured to receive a zip code from a user. The submission of a zip code via zip code field 204 may modify the search query to return only those entities that fall within geographic constraints of the received zip code. The price range field 206 may be configured to provide a drop down list of predetermined price ranges for a particular entity. The selection of a particular price range provided by price range field 206 may modify a search query to return only those entities that fall within the selected price range. Alternatively, a user may be able to manually insert a custom price range into price range field 206. Price range field 206 may be configured to receive a price in any currency including, for example, dollars, euros, pounds, francs, yen, renminbis, or the like. The neighborhood field 208 may provide a drop down list of particular neighborhoods that may be searched. Alternatively, the neighborhood field may be configured to receive a custom neighborhood from a user. The selection, or submission, of a neighborhood using neighborhood field 208 may modify a search query to return only those entities that fall within the geographic constraints associated with that particular neighborhood.

The polygon search button 210 of graphical user interface 200A may provide an alternative method of searching entities. In some implementations, the user may select polygon search button 210. In response to the selection of polygon search button 210, the application associated with user interface 200A may enter polygon mode. In polygon mode, a user of client device 110 may be able to use a drawing instrument such as, for example, a stylus or user's finger, in order to draw a shape on the map 212 that is indicative of a search space. After the user completes the drawing of a shape, a search query may be generate that returns each of the entities that reside within the geographic constraints of the drawn shape on map 212. Alternatively, the generated search query may be further constrained by any of the data also input by the user into search field 202, zip code field 204, price range field 206, neighborhood field 208, or the like.

In the example illustrated by FIG. 2A, a user has input search criteria that includes the keyword "apartments" in search field 202, a price range of "$65-$120" in the price range field 206, and a neighborhood of "Atlantic City" in the neighborhood field 208. The application running on client device may generate a query based on the received search criteria, forward the query to front-end application server 130, and the search query may be executed by one or more back-end components of system 100 such as, location search engine 140. Alternatively, the unstructured search criteria entered by a user via graphical user interface 200A may be transmitted to front-end application server 130, front-end application server 130 may then generate a search query based on the received search criteria, and then the search query may be executed by one or more back-end components of system 100 such as, location search engine 140. Then search results such as, for example, the apartments listed in search results 220a may be returned to client device 110, and displayed via graphical user interface 200A. The depicted state of graphical user interface 200A is an example of the graphical user interface that may appear when the ranking engine 160 has been toggled off. Accordingly, the listing of search results in graphical user interface 200A may include a set of search results that includes multiple entities that are not ranked based on the best available deal.

The initial set of search results 220a depicted by graphical user interface 200A may be displayed as a list of search results that may include, for example, Boardwalk 222a, Park Place 224a, Marvin Gardens 226a, and Ventnor Ave. 228a. Alternatively, or in addition, the search results may be depicted on a map 212 of the geographic location associated with the apartments. In some implementations, the map 212 may include a graphical icon associated with the geographic location of each identified search result. For instance, the map 212 may provide a Boardwalk graphical icon 232a, a Park Place graphical icon 234a, a Marvin Gardens graphical icon 236a, and a Ventnor Ave. graphical icon 238a. Since a user has not yet engaged the rank by best deal button 270, the search results 220a are listed according to the predetermined order generated by location search engine 140. For instance, search results may be ordered by a default ordering of the most expensive apartments. Such a listing may be sought by a user of client device 110 who has an unlimited budget in order to find the ritziest apartments available in a particular neighborhood. Accordingly, search results 220a include a list of search results ranked in a manner that places Boardwalk 222a first with a current monthly rent of $100, Park Place 224a second with a current monthly rent of $95, Marvin Gardens 226a third with a current monthly rent of $94, and Ventnor Ave. 228a fourth with a current monthly rent of $70.

In some implementations, each entity that is identified as a search result may be associated with one or more historical values. For instance, each of Boardwalk, Park Place, Marvin Gardens, and Ventnor Ave. may be each be associated with historical rent prices 242a, 244a, 246a, and 248a respectively. For instance, Boardwalk 222a may be associated with historical rent prices 242a of $100 for July, $100 for August, $100 for September, and $100 for October. Park place 224a may be associated with historical rent prices 244a of $100 for July, $91 for August, $98 for September, and $95 for October. Marvin Gardens 226a may be associated with historical rent prices 246a of $100 for July, $110 for August, $93 for September, and $94 for October. Ventnor Ave. 228a may be associated with historical rent prices of $100 for July, $90 for August, $80 for September, and $70 for October. The historical rent prices 242a, 244a, 246a, and 248a may be stored in historical value information database 152, and be accessible to ranking engine 160.

In at least one implementation, a user of client device 110 may decide to search entities based on the best available deals 270. In such instances, a user may select the rank by best deals button 270. In response to the selection of the rank by best deal button 270, the client device 110 may transmit a request to front-end application server 130 that re-ranked the search results based on the best available deals. For instance, the entities in search result 220a may be re-ranked based on the extent that the current value for each entity in a geographic location deviates from historical values associated with the entity.

In the example of FIG. 2A, system 100 may analyze the extent that a current monthly rent price for each apartment deviates from historically known monthly rent prices for the apartment and calculate a ranking score based on the deviation. In some implementations, only the subset of apartments associated with a current monthly rent price that deviates more than a threshold amount from a historical monthly rent price over a predetermined amount of time may be selected for inclusion in a set of deal based search results. Alternatively, or in addition, the subset of entities selected for inclusion in the set of deal based search results may be ranked in an order that is based on a ranking score that may be indicative of the extent that the current monthly rent price for an apartment deviates from historical monthly rent prices for the apartment. For instance, the search result that corresponds to the apartment associated with a current monthly rent that has the greatest deviation from a historical monthly rent may be associated with the highest ranking score. In some implementations, it may be determined that all relevant search results should be listed based on the calculated ranking score, without comparison of the deviated value to a value benefit threshold.

Per the example of FIG. 2A, in response to the selection of rank by best deals button 270 ranking engine 160 may analyze a set of search results based on the best available deals. In this example, the best deal may be based on each entity's deviation from one or more historical values. Determining a particular deviation of a current value from a historical value may include a historical analysis of each entity's historical value information maintained in historical value information database 152. For instance, a historical analysis of Boardwalk's 222a monthly rent prices indicates that Boardwalk's 222A current monthly rent price has not deviated a single dollar from known historical monthly rent prices 242a from July to October. Similarly, a historical analysis of Park Place's 224a monthly rent prices indicates that Park Place's 224a current monthly rent price has deviated $5 from known historical monthly rent prices 244a from July to October. Historical analysis of Marvin Gardens' 226a monthly rent prices indicates that Marvin's Gardens' 226a current monthly rent price has deviated $6 from known historical monthly rent values 246a from July to October. However, during the time period 250 from August to October, known historical monthly rent values 246a indicate that Marvin Gardens' monthly rent price changed $16. Finally, a historical analysis of Ventnor Ave.'s 228a historical monthly rent prices indicate that Ventnor Ave.'s 228a current monthly rent price has deviated $30 from known historical rent values 148a from July to October.

The amount each apartment's current monthly rent deviates from historical monthly rents may be analyzed to determine the extent the current monthly rent for each apartment has deviated from one or more historical monthly rents over a predetermined period of time. In one implementation, only those search results corresponding to an apartment that has a current monthly rent that deviates from a historical monthly rent by more than a threshold amount may be selected for inclusion in the deal based search result. For instance, with respect to FIG. 2A, assume a deviation threshold of $10 or more below a historical monthly rent price over a predetermined time period. Such a deviation threshold may limit the set of deal based search results to only those apartments that are associated with a current monthly rent price that has deviated $10 or more below historical monthly rent prices for the apartment over a predetermined period of time. Alternatively, or in addition, each respective search result may be returned, and each search result in the search results may be assigned a ranking score based on the extent that a current monthly rent deviates from a historical monthly rent. For instance, search results corresponding to an apartment that is associated with a current monthly rent that deviates a greater amount from known historical monthly rent values may be ranked higher than those search results that correspond to an apartment whose current monthly rent deviates a lesser amount from known historical monthly rents. When a set of deal based search results based on the selection of rank by best deals button 270 is generated for the example of FIG. 2A, the user interface 200B of FIG. 2B may be provide.

Figure 2B:
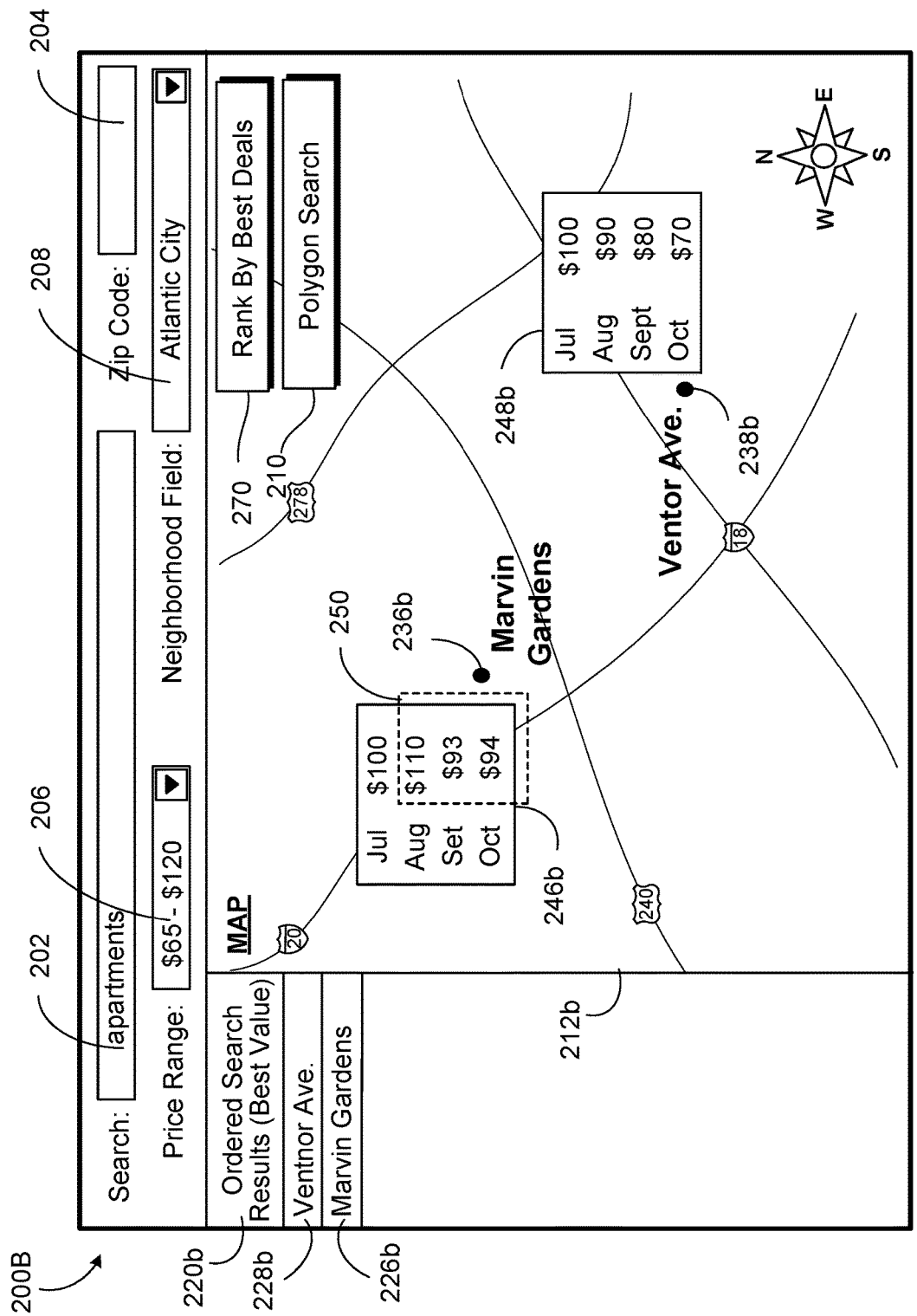
FIG. 2B is an example of a graphical user interface for displaying search results that may include multiple entities that provide the best available deals within a predetermined geographic region.

FIG. 2B is an example of a graphical user interface 200B for displaying search results 220b that may include multiple entities 226b, 228b that have been identified as providing a best available deals within a predetermined geographic region 212b. Graphical user interface 200B may be provided in response to a user selection of the rank by best deals button 270 shown in FIG. 2A.

Graphical user interface 200B may be substantially similar to graphical user interface 200A, with the exception that the search results of graphical user interface 200B have been identified based on the best available deals. For example, the search queries used in 200A and 200B are substantially similar in that both search queries are based on a search field 202 keyword of "apartments," a price range field 206 value of "$65-$100," and a neighborhood field value 208 of "Atlantic City." However, the search results 220b of graphical user interface 200B have been selected, ranked, and ordered based on the best available deals.

Though it has been established via graphical user interface 200A that apartments satisfying a search query based on search criteria with a search field 202 keyword of "apartments," a price range field 206 value of "$65-$100," and a neighborhood field value 208 of "Atlantic City," include Boardwalk 222a, Park Place 224a, Marvin Gardens 226a, and Ventnor Ave. 228a, value based search results based on substantially the same query only include Ventnor Ave. 228b and Marvin Gardens 226b. Ventnor Ave. 228b was selected for inclusion in the deal based search results because Ventnor Ave. 228b has a current value $70 that deviates $30 from a historical value of $100 from the time period spanning July to October. This deviation of $30 is greater than the threshold amount of $10, on which the value search is based. Marvin Garden's 226b is also included in the value based search results 220b based on the triggering of the $10 deviation threshold. Though Marvin Garden's 226b historical value during the time period of July to October has only deviated $6 from $100 to $94, Marvin Garden's 226b triggered the $10 deviation threshold based upon a qualified time period 250. This qualified time period 250 is a time period within the predetermined time period used to analyze historical values. Since Marvin Gardens 226b was associated with a value deviation for at least a subset of the analyzed time period, Marvin's Gardens 226b may be selected for inclusion in the deal based search results 220b.

Results 220b may exclude apartments such as, for example, Boardwalk 222a and Park Place 224a. Apartments such as Boardwalk 222a and Park Place 224a generally satisfy the search criteria constraints input by the user in fields 202, 206, and 208. However, deals, system 100 may exclude these apartments from the search results when analyzing known apartments to identify the best available deals. This is because neither Boardwalk 222a or Park Place 224a are associated with a value that deviates more than a threshold amount from their respective historical values over the predetermined amount of time such as, for example, July to October. For instance, Boardwalk's 222a current value has not deviated a single dollar from known historical values 242a and Park Place's 224a current value has only deviated $6 from known historical values 244a. As result, neither Boardwalk 222a or Park Place 224a are associated with a value that has deviated $10 or more less than a known historical value within the predetermined time period under analysis. Accordingly, though Boardwalk 222a and Park Place 224a may be high end apartments that offer the best amenities, are highly in demand, and generally satisfy the search criteria constraints input by a user into search fields 202, 206, and 208, system 100 may determine in response to a request to rank apartments by best deal 270 that Boardwalk 222a and Park Place 224a do not provide the best available deal.

Figure 3A:
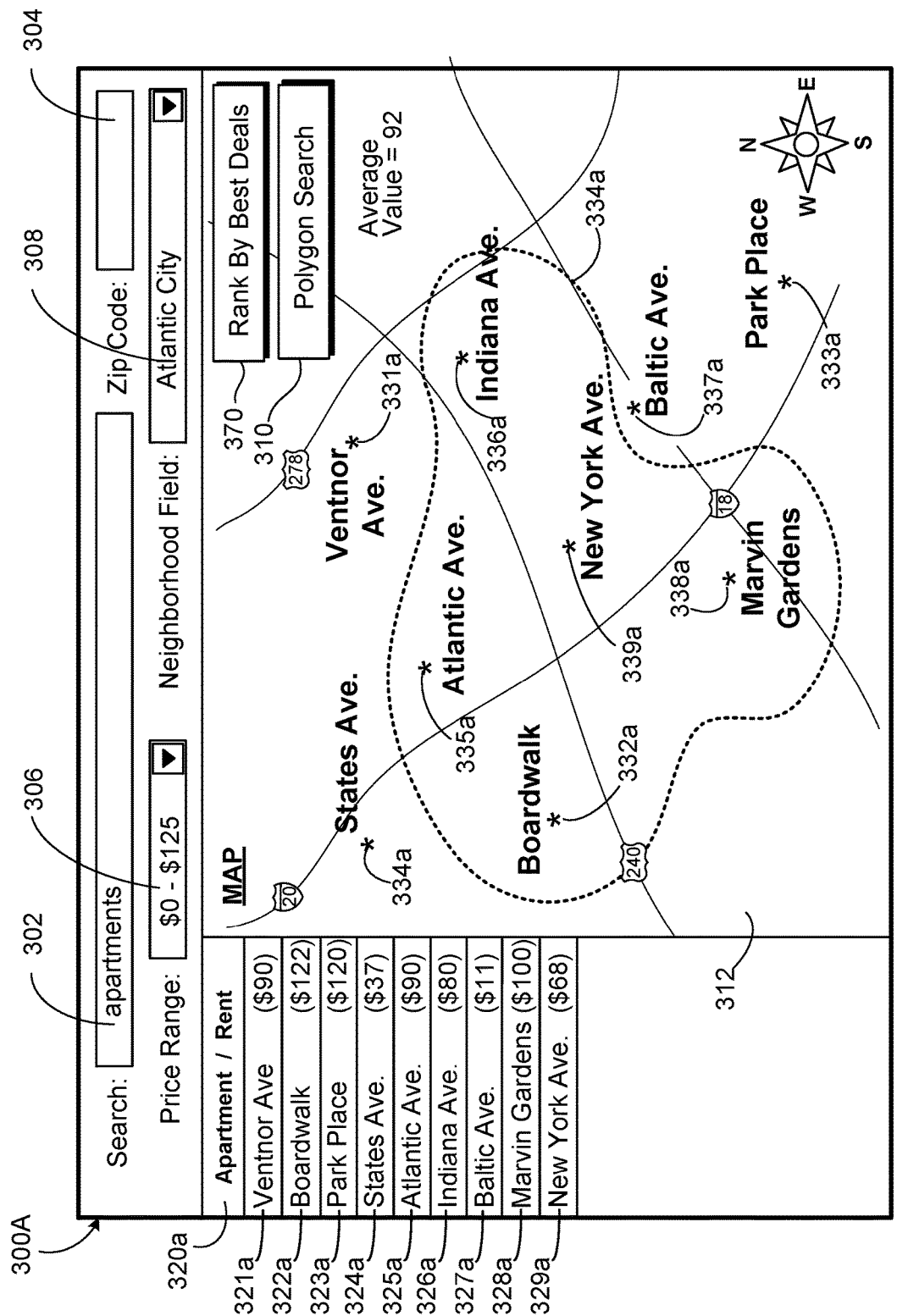
FIG. 3A is another example of a graphical user interface for displaying a set of search results that may include multiple entities in response to a search query.

FIG. 3A is an example of a graphical user interface 300A for displaying a set of search results 320a that includes multiple entities in response to a search query. The graphical user interface 300A may include a search field 302, a zip code field 304, a price range field 306, a neighborhood field 308, a polygon search button 310, a map 312, a list of search results 320a, and a rank by best deal button 370. Each of search field 302, zip code field 304, price range field 306, neighborhood field 308, polygon search button 310, and map 312 may be substantially similar to the search field 202, zip code field 204, price range field 206, neighborhood field 208, polygon search button 210, and map 212 as described with respect to FIG. 2A. However, the rank by best deal button 370 of graphical user interface 300A may be configured to initiate a different deal based search than that initiated by rank by deal button 270, described above.

In the example illustrated by FIG. 3A, a user has input search criteria that includes the keyword "apartments" in search field 302, a price range of "$0-$125" in the price range field 306, and a neighborhood of "Atlantic City" in the neighborhood field 308. The application running on client device may generate a query based on the received criteria, forward the query to front-end server 130, and the search query may be executed by one or more back-end components of system 100 such as, location search engine 140. Alternatively, the unstructured search criteria entered by a user via graphical user interface 300A may be transmitted to front-end application server 130, front-end application server 130 may then generate a search query based on the received search criteria, and then the search query may be executed by one or more back-end components of system 100 such as, location search engine 140. Then search results such as, for example, apartments listed in search results 320a may be returned to client device 110, and displayed via graphical user interface 300A. The depicted state of graphical user interface 300A is an example of the graphical user interface that may appear when the ranking engine 160 has been toggled off. Accordingly, the listing of search results in graphical user interface 300A includes a set of search results that includes multiple entities that are not ranked based on the best available deal.

The initial set of search results depicted by graphical user interface 300A may be displayed as a list of search results 320a that includes the name of the apartment and a current value associated with the apartment such as, for example, the current monthly rent for the property. For example, the list of search results responsive to the search criteria input via graphical user interface 300A may include Ventnor Ave. ($90) 321a, Boardwalk ($122) 322a, Park Place ($120) 323a, States Ave. ($37) 324a, Atlantic Ave. ($90) 325a, Indiana Ave. ($80) 326a, Baltic Ave. ($11) 327a, Marvin Gardens ($100) 328*a*, and New York Ave. ($68) 329*a*. Alternatively, or in addition, the search results may also be depicted on a map 312 of the geographic location associated with the apartments. In some implementations, the map 312 may include a graphical icon associated with the geographic location of each identified search results. For instance, the map 312 may provide a Ventnor Ave. graphical icon 331*a*, a Boardwalk graphical icon 332*a*, a Park Place graphical icon 333*a*, an States Ave. graphical icon 334*a*, an Atlantic Ave. graphical icon 335*a*, an Indiana Ave. graphical icon 336*a*, a Baltic Ave. graphical icon 337*a*, a Marvin Gardens graphical icon 338*a*, and New York Ave. graphical icon 339*a*. Since a user has not yet engaged the rank by best deal button 370, the search results 320*a* may be listed according to the predetermined order generated by location search engine 140. For instance, search results may be ordered in list 320*a* based on the amount of money paid by a landlord associated with each apartment. For example, location based search engine 140 may be configured to identify search results responsive to a search query, and then provide search results that are ordered based on the amount of money received from each respective landlord to boost a search result ranking score associated with the landlord's property. In the example of FIG. 3A, the landlord of Ventnor Ave 321*a* may have paid the most amount of money to the operator of system 100 in order to boost the search result ranking score associated with Ventnor Ave 321*a*. On the other hand, the landlord of New York Ave. 329*a* may have paid the least amount of money to the operator of system 100 in order to boost the search result ranking score associated with New York Ave. 329*a*. Thus, a set of search results provide via graphical user interface 300 may provide search results that are not indicative of any particular value.

In some implementations, a user may choose to initiate a search to identify the best available deal. For example, a user may choose to select rank by best deal button 370. Rank by best deal button 370 may be configured to initiate instruct system 100 to identify entities based on a deviation of an entity's current value from a representative value associated with other substantially similar entities in a particular geographic location. In one implementation, a representative value may include an average value of other substantially similar entities located within a particular geographic region. For instance, a user may utilize a graphical user interface such as 300A in order to initiate a best value search for an iPad in Atlantic City. System 100 may then identify a set of search results that each correspond to an iPad that is for sale in the neighborhood of Atlantic City. Then, ranking engine 160 may analyze a value associated with each iPad, and generate a representative value for the set of iPads for sale in Atlantic City. In one implementation, the value associated with each iPad may be the current price of each iPad. The representative value may include the average price of all the iPad's for sale in Atlantic City. Then, the ranking engine 160 may determine the extent that the price of each iPad deviates from the representative value of all the iPads for sale in Atlantic City. Ranking engine 160 may then select a subset of the search results that correspond to an iPad that deviate from the representative value by more than a threshold amount, and return the subset of search results to client device 110. Alternatively, or in addition, ranking engine 160 may calculate a ranking score that is indicative of the extent that the price of each iPad deviates from the representative value, rank the search results based on the ranking score, and then return the ordered search results to client device 110.

In the example of 300A, it is assumed that each of the apartments provided in the list of search results 320*a* are substantially similar apartments offered for lease by a realtor company such as, for example, Monopoly, Inc. To facilitate a best available deals search based on deviation of a current value from a representative value, system 100 may first need to identify a candidate apartment and a candidate neighborhood to be searched. In response to the selection of the rank by best deal button 370, system 100 may determine the last apartment selected by a user. For instance, assume that prior to selection of the rank by best deal button 370, a user of client device 370 selected Boardwalk 322*a*. Then, in response to the rank by best deal button 370, system 100 may identify all Monopoly, Inc. properties that are substantially similar to Boardwalk 322*a* and that also reside within the same geographic location 334*a* as Boardwalk 322*a*. In this instance, the best deal calculation may be described as requiring the user to select a particular apartment prior to selection of the rank by best deal button 370. However, the present disclosure need not be so limited. For instance, system 100 may automatically identify a candidate entity and candidate geographic location in response to the selection of a rank by best deal button 370. For instance, a candidate entity and candidate geographic location may be determined based on, for example, a user's apartment search history.

System 100 may calculate a representative value once the subset of substantially similar properties to Boardwalk 322*a* within a particular candidate neighborhood 334*a* are identified. For instance, the representative value may be the average value of the current monthly rent for each substantially similar apartment residing within the particular candidate neighborhood 334*a*. In the example of FIG. 3A, the particular candidate neighborhood may include Boardwalk 332*a* with a monthly rent of $122, Atlantic Ave. 335*a* with a monthly rent of $90, Indiana Ave. 336*a* with a current monthly rent of $80, Marvin Gardens 338*a* with a current monthly rent of $100, and New York Ave. 339*a* with a current monthly rent of $68. System 100 may then calculate a representative average monthly rent value for the set of Monopoly, Inc. properties substantially similar to Boardwalk 332*a* with the particular neighborhood 334*a*. In accordance with the example of FIG. 3A, the representative average monthly rent value may be, for example, $92.

Ranking engine 160 of system 100 may then analyze each search result that corresponds to each of the apartments that are substantially similar to Boardwalk 332*a* to determine the extent that the current monthly rent for each apartment deviates from the representative value. For instance, ranking engine 160 may select each of the apartments for inclusion in the value based search results that deviate from the representative value by a predetermined threshold amount. For example, with respect to the example of FIG. 3A, assume a deviation threshold may be determined to be a deviation of $10 or more below the representative value. Such a deviation threshold may limit the set of deal based search results to only those apartments that are associated with a current monthly rent that is $10 or more below the representative average value. Alternatively, or in addition, each respective search results may be returned, and each search result in the set of search results may be assigned a ranking score based on the extent that the current monthly rent deviates from the representative value. For instance, search results that deviate a greater amount from the representative value may be ranked higher than those whose current monthly rent deviates a lesser amount from the representative value.

A value based similarity analysis of the deviation of each apartment's current monthly rent from the representative value of $92 indicates that the current monthly rent for Boardwalk 332a and Marvin Gardens 338a is not lower than the representative value. A similar value based similarity analysis indicates that the current monthly rent for Indiana Ave. 336a is $12 less than the representative value and the current monthly rent for New York Ave. 339a is $24 less than the representative value. Finally, the similarity analysis indicates that the current monthly rent for Atlantic Ave. 335a is $2 less than the representative value. When a set of deal based search results based on the selection of rank by best deal button 370 is generated for the example of FIG. 3A, the user interface 300B of FIG. 3B may be provide.

Figure 3B:
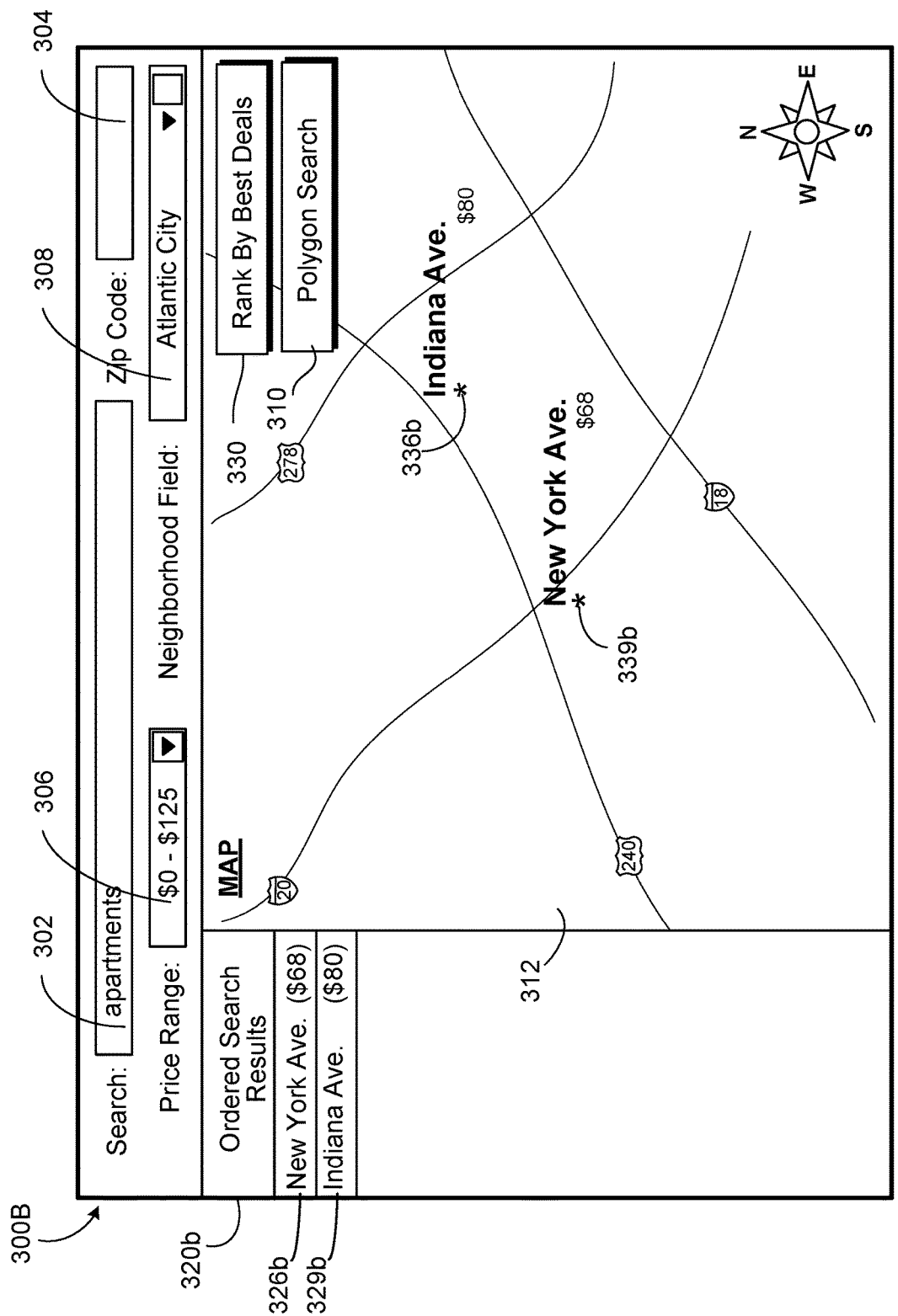
FIG. 3B is an example of a graphical user interface for displaying search results that may include multiple entities that provide the best available deals within a predetermined geographic region.

FIG. 3B is an example of a graphical user interface 300B for displaying search results 320b that may include multiple entities that provide a best deals within a predetermined geographic region. Graphical user interface 300B may be provided in response to a user selection of the rank by best deals button 370 shown in FIG. 3A.

Graphical user interface 300B may be substantially similar to graphical user interface 300A, with the exception that the search results of graphical user interface 300B have been identified based on the based available deals. For example, the search queries used in 300A and 300B are substantially similar in that both search queries are based on a search field 302 keyword of "apartments," a price range field 306 value of "$0-$125," and a neighborhood field value 308 of "Atlantic City." However, the search results 320b of graphical user interface 300B have been selected, ranked, and ordered based on the best available deals.

Though it has been established via graphical user interface 300A that apartments satisfying a search query based on search criteria with a search field 302 keyword value of "apartments," a price range field 306 value of "$0-$125," and a neighborhood field value 308 of "Atlantic City," yield search results that include Ventnor Ave. 321a, Boardwalk 322a, Park Place 323a, States Ave. 324a, Atlantic Ave. 325a, Indiana Ave. 326a, Baltic Ave. 327a, Marvin Gardens 328a, and New York Ave. 329a, value based search results based on substantially the same query may only include New York Ave. 326b and Indiana Ave. 329b. New York Ave. 326b was selected for inclusion in the deal based search results because New York Ave. 326b is determined to be substantially similar to the candidate apartment Boardwalk 322a, is located within the same geographic location 334a as the candidate apartment Boardwalk 322a, and is associated with a current rent of $68 that deviates $24 from the representative value of $92. This deviation of $24 is more than the threshold amount of $10 less than the representative value, on which the deal search is based in this example. Indiana Ave. 329b was selected for inclusion in the deal based search results because Indiana Ave. 329b is determined to be substantially similar to the candidate apartment Boardwalk 322a, is located within the same geographic location 334a as the candidate apartment Boardwalk 322a, and is associated with a current rent of $80 that deviates $12 from the representative value of $92. This deviation of $12 is more than the threshold amount of $10 less than the representative value, on which the deal search is based.

Results 320b may exclude apartments such as, for example, Boardwalk 332a, Marvin Gardens 338a, and Atlantic Ave. 335a. Apartments such as Boardwalk 332a, Marvin Gardens 338a, and Atlantic Ave. 335a generally satisfy the search criteria constraints input by the user in fields 302, 306, and 308. However, system 100 may exclude these apartments from the search results when analyzing known apartments to identify the best available deals. This is because neither Boardwalk 332a, Marvin Gardens 338a, and Atlantic Ave. 335a are associated with a current monthly rent that deviates more than the predetermined threshold amount from the representative average value of $92. For instance, Boardwalk's 332a current monthly rent of $122 and Marvin Gardens' 338a currently monthly rent of $100 are each greater than the representative value of $92. Although Atlantic Ave. 335a is associated with a current monthly rent of $90 that is $2 below the representative value of $92, Atlantic Ave.'s 335 current monthly rent of $90 does not satisfy the predetermined threshold deviation of $10 or more below the representative value. As a result, neither Boardwalk 332a, Marvin Gardens 338a, and Atlantic Ave. 335 are associated with a currently monthly rent that has deviated more than $10 below the representative value.

Accordingly, though Boardwalk 332a, Marvin Gardens 338a, and Atlantic Ave. 335a may be high end apartments that offer the best amenities, are highly in demand, and generally satisfy the search criteria constraints input by a user into search fields 302, 306, and 308, system 100 may determine in response to a request to rank apartments by best deal 370 that Boardwalk 332a, Marvin Gardens 338a, and Atlantic Ave. 335a do not provide the best deals for apartments that otherwise satisfy such search criteria. Furthermore, the best deal 370 may indicate that apartments substantially similar to Boardwalk 332a, Marvin Gardens 338a, and Atlantic Ave. 335, and in the same neighborhood as Boardwalk 332a, Marvin Gardens 338a, and Atlantic Ave. 335 are available for a lower current monthly rent.

The examples described in this specification have described the identification of a set of search results that provide the best available deals for a particular type of entity. In these examples, known entities have been analyzed based on various deviations in a particular value. Though the exemplary value deviations described in this specification have been examples of value deviations based on price, this specification is not so limited. For instance, alternative implementations may determine best available deals by analyzing other values associated with an entity such as, for example, the square footage of an apartment, townhouse, house, or the like. Alternatively, two or more values may be analyzed in relation to one another in order to identify a set of best available deals. For example, a set of best deals may be identified based on the biggest apartment available for a particular monthly rent.

Alternatively, or in addition, system 100 may access, receive, obtain, or otherwise calculate a variety of different values associated with an entity. For instance, in one implementation, system 100 may be able to obtain a value indicative of the price-per-square-foot for each known apartment. Once a value such as, for example, price-per-square-foot is determined for a particular entity, such a value may be analyzed in order to identify the best available deals. For instance, system 100 may analyze a set of known entities in order to determine the extent that an entity's current price-per-square-foot value deviates from historical price-per-square-foot values. Alternatively, or in addition, system 100 may analyze a set of known entities in order to determine the extent that a particular entity's current price-per-square-foot value deviates from the price-per-square-foot value that is associated with other substantially similar entities, or a representative value thereof, in a particular geographic location.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. Other steps may be provided, or steps may be eliminated, from the described flows, and other components may be added to, or removed from, the described systems. In some cases, multitasking and parallel processing may be advantageous.

What is claimed is:

1. A computer-implemented method comprising:
receiving a query that specifies a set of search parameters defining the scope of a search, wherein the search parameters includes a location and one or more other search criteria;
identifying candidate entities that are identified as responsive to the query based on the search parameters;
determining an initial ranking for the identified candidate entities based on a relevance of the candidate entities to the search parameters;
determining that the initial ranking for the identified candidate entities is to be adjusted;
in response to a determination that the initial ranking for the identified candidate entities is to be adjusted, determining a value-based ranking score that is independent of the relevance of the candidate entities to the search parameters for at least one of the candidate entities, wherein determining the value-based ranking score comprises:
  determining, for the at least one candidate entity, (i) a current value of an attribute that is currently associated with the at least one candidate entity and, (ii) a historical value of the attribute that was associated with the at least one candidate entity at a past time;
  determining that the current value of the attribute that is currently associated with the at least one candidate entity deviates more than a threshold amount from the historical value of the attribute that is associated with the at least one candidate entity;
  in response to determining that the current value of the attribute that is currently associated with the at least one candidate entity deviates more than a threshold amount from the historical value of the attribute that is associated with the at least one candidate entity, adjusting a ranking score for the at least one candidate entity;
generating a set of search results that promotes the at least one candidate entity above one or more of the other candidate entities based at least on the adjusted ranking score for the at least one candidate entity; and providing a search results page for output on a display of a user device that outputs the generated set of search results ordered based on the adjusted ranking score.

2. The computer-implemented method of claim 1, wherein the value is price-per-square-foot.

3. The computer-implemented method of claim 1, wherein the candidate entities include one or more apartments.

4. The computer-implemented method of claim 1, wherein the threshold amount from the historical value is set to a value that is a predetermined amount less than the historical value of the attribute.

5. The computer-implemented method of claim 1, wherein the threshold amount from the historical value is set to a value that is a predetermined amount more than the historical value of the attribute.

6. A system comprising:
one or more processors and one or more computer storage media storing instructions that are operable, when executed by the one or more processors, to cause the one or more processors to perform operations comprising:
receiving a query that specifies a set of search parameters defining the scope of a search, wherein the search parameters includes a location and one or more other search criteria;
identifying candidate entities that are identified as responsive to the query based on the search parameters;
determining an initial ranking for the identified candidate entities based on a relevance of the candidate entities to the search parameters;
determining that the initial ranking for the identified candidate entities is to be adjusted;
in response to a determination that the initial ranking for the identified candidate entities is to be adjusted, determining a value-based ranking score that is independent of the relevance of the candidate entities to the search parameters for at least one of the candidate entities, wherein determining the value-based ranking score comprises:
determining, for the at least one candidate entity, (i) a current value of an attribute that is currently associated with the at least one candidate entity and, (ii) a historical value of the attribute that was associated with the at least one candidate entity at a past time;
determining that the current value of the attribute that is currently associated with the at least one candidate entity deviates more than a threshold amount from the historical value of the attribute that is associated with the at least one candidate entity;
in response to determining that the current value of the attribute that is currently associated with the at least one candidate entity deviates more than a threshold amount from the historical value of the attribute that is associated with the at least one candidate entity, adjusting a ranking score for the at least one candidate entity; and
generating a set of search results that promotes the at least one candidate entity above one or more of the other candidate entities based at least on the adjusted ranking score for the at least one candidate entity; and
providing a search results page for output on a display of a user device that outputs the generated set of search results ordered based on the adjusted ranking score.

7. The system of claim 6, wherein the value is price-per-square-foot.

8. The system of claim 6, wherein the candidate entities include one or more apartments.

9. The system of claim 6, wherein the threshold amount from the historical value is set to a value that is a predetermined amount less than the historical value of the attribute.

10. The system of claim 6, wherein the threshold amount from the historical value is set to a value that is a predetermined amount more than the historical value of the attribute.

11. A non-transitory computer-readable medium having stored thereon instructions, which, when executed by one or more computers, cause the one or more computers to perform operations of:
receiving a query that specifies a set of search parameters defining the scope of a search, wherein the search parameters includes a location and one or more other search criteria;
identifying candidate entities that are identified as responsive to the query based on the search parameters;
determining an initial ranking for the identified candidate entities based on a relevance of the candidate entities to the search parameters;
determining that the initial ranking for the identified candidate entities is to be adjusted;
in response to a determination that the initial ranking for the identified candidate entities is to be adjusted, determining a value-based ranking score that is independent of the relevance of the candidate entities to the search parameters for at least one of the candidate entities, wherein determining the value-based ranking score comprises:
determining, for the at least one candidate entity, (i) a current value of an attribute that is currently associated with the at least one candidate entity and, (ii) a historical value of the attribute that was associated with the at least one candidate entity at a past time;
determining that the current value of the attribute that is currently associated with the at least one candidate entity deviates more than a threshold amount from the historical value of the attribute that is associated with the at least one candidate entity;
in response to determining that the current value of the attribute that is currently associated with the at least one candidate entity deviates more than a threshold amount from the historical value of the attribute that is associated with the at least one candidate entity, adjusting a ranking score for the at least one candidate entity; and
generating a set of search results that promotes the at least one candidate entity above one or more of the other candidate entities based at least on the adjusted ranking score for the at least one candidate entity; and
providing a search results page for output on a display of a user device that outputs the generated set of search results ordered based on the adjusted ranking score.

12. The computer-readable medium of claim 11, wherein the value is price-per-square-foot.

13. The computer-readable medium of claim 11, wherein the candidate entities include one or more apartments.

14. The computer-readable medium of claim 11, wherein the threshold amount from the historical value is set to a value that is a predetermined amount less than the historical value of the attribute.

15. The computer-readable medium of claim 11, wherein the threshold amount from the historical value is set to a value that is a predetermined amount more than the historical value of the attribute.

* * * * *